United States Patent
Raghavan et al.

(10) Patent No.: US 12,369,025 B2
(45) Date of Patent: Jul. 22, 2025

(54) RADIO ACCESS NETWORK ADDRESS ASSIGNMENT

(71) Applicant: Rakuten Mobile, Inc., Tokyo (JP)

(72) Inventors: Sathyadeep Raghavan, Tokyo (JP); Ramkumar Moorthy, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 17/635,697

(22) PCT Filed: Jan. 28, 2022

(86) PCT No.: PCT/US2022/014234
§ 371 (c)(1),
(2) Date: Feb. 16, 2022

(87) PCT Pub. No.: WO2023/146528
PCT Pub. Date: Aug. 3, 2023

(65) Prior Publication Data
US 2024/0040371 A1 Feb. 1, 2024

(51) Int. Cl.
*H04W 8/26* (2009.01)
(52) U.S. Cl.
CPC ..................... *H04W 8/26* (2013.01)
(58) Field of Classification Search
CPC .... H04W 8/26; H04W 24/02; H04L 61/5007; H04L 41/0806

USPC ......................................................... 370/254
See application file for complete search history.

(56) References Cited

U.S. PATENT DOCUMENTS

| | | | |
|---|---|---|---|
| 10,791,507 B1 * | 9/2020 | Mukherjee | H04W 4/029 |
| 11,870,768 B1 * | 1/2024 | Vishwakarma | H04W 8/26 |
| 2015/0208294 A1 | 7/2015 | Lee et al. | |
| 2018/0337885 A1 | 11/2018 | Singh et al. | |
| 2019/0289647 A1 | 9/2019 | Li | |
| 2020/0351653 A1 | 11/2020 | Khan et al. | |
| 2021/0092708 A1 | 3/2021 | Ryu et al. | |
| 2021/0315030 A1 * | 10/2021 | Teyeb | H04L 61/5076 |
| 2021/0321467 A1 * | 10/2021 | Hampel | H04W 76/11 |
| 2022/0201777 A1 * | 6/2022 | Teyeb | H04L 45/302 |
| 2022/0295579 A1 * | 9/2022 | Mildh | H04W 76/12 |
| 2023/0164072 A1 * | 5/2023 | Prabhudesai | H04L 61/256 370/310 |
| 2024/0365171 A1 * | 10/2024 | Jang | H04W 80/02 |

* cited by examiner

*Primary Examiner* — Kwang B Yao
*Assistant Examiner* — Syed M Bokhari
(74) *Attorney, Agent, or Firm* — HAUPTMAN HAM, LLP (57) ABSTRACT

Radio access network address assignment is performed by assigning, to a distributed unit of an access point for a radio access network, a first management address value from a pool of address values, receiving a notification from a radio unit connected to the radio access network through the distributed unit, instructing the radio unit to erase a recording of a second management address value in a memory unit of the radio unit, and instructing the distributed unit to notify the radio unit of the first management address value after instructing the radio unit.

20 Claims, 5 Drawing Sheets

RADIO ACCESS NETWORK ADDRESS ASSIGNMENT

RELATED APPLICATIONS

The present application is a National Phase of International Application No. PCT/US2022/014234, filed Jan. 28, 2022.

BACKGROUND

Radio access networks are constantly expanding. Adding new cell sites is a process for expanding or enhancing a radio access network. Due to the short range of 5G communication, new cell sites are expected to be added at a significantly increased rate. Adding a new cell site includes commissioning of all units involved in the cell site. In addition to adding new cell sites, existing cell sites must be re-commissioned from time to time due to scheduled maintenance or unexpected failures.

Radio Access Networks (RAN) utilizing Open RAN, where the interfaces and protocols between the RAN components are open and interoperable, have emerged. Open RAN splits the functions of an access point of a cell site among a central unit (CU), a distributed unit (DU), and a radio unit (RU). One CU is able to be connected to hundreds of DU, and one DU is able to be connected to less than ten RU.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. In addition, the present disclosure may repeat reference numerals and/or letters in the various examples. This repetition is for the purpose of simplicity and clarity and does not in itself dictate a relationship between the various embodiments and/or configurations discussed.

In radio access networks, auto commissioning is used to bring a new cell site up and online as an access point for the radio access network. Among the methods of bringing a new cell site up and online are instantiation and re-instantiation. Instantiation is performed when a new cell site is initially added to the radio access network. Re-instantiation is performed as necessary in response to the cell site going down, such as for scheduled maintenance or unexpectedly.

During re-instantiation, the DU address, such as an Internet Protocol (IP) address, is assigned from a pool of potential addresses. This address serves as a management address from the perspective of the RU connected to the DU. The RU connected to the DU store the management address in memory. In the case of instantiation, the RU receives the management address from the DU and records the management address to the memory. In the case of re-instantiation, the RU receives the management address from the DU, but does not record the management address to the memory, because a management address already exists on the memory. When this happens, the RU cannot communicate with the DU, and the access point does not function properly. One method for avoiding this is to manually intervene to clean the RU database, and erase the management address. However, manual intervention utilizes additional time, which becomes inefficient as a radio access network grows. At least some embodiments herein provide a way to automate management address erasure as part of the instantiation process to reduce manual intervention and also reduce the overall time to re-instantiate sites.

In at least some embodiments herein, a re-instantiation process includes an enhancement to avoid manual intervention. In at least some embodiments, an apparatus responsible for conducting re-instantiation deletes RU data during the re-instantiation procedure. In at least some embodiments, a normal re-instantiation flow of an Operations Support System (OSS), which does not check the RU management address, is modified to include deleting old RU data and pushing the new management address for bringing the RU up and online.

At least some embodiments herein reduce the dependency of human intervention in the re-instantiation flow. At least some embodiments herein significantly reduce overall re-instantiation time from triggering the auto commissioning call flow until RU/DU management address allocation.

Figure 1:
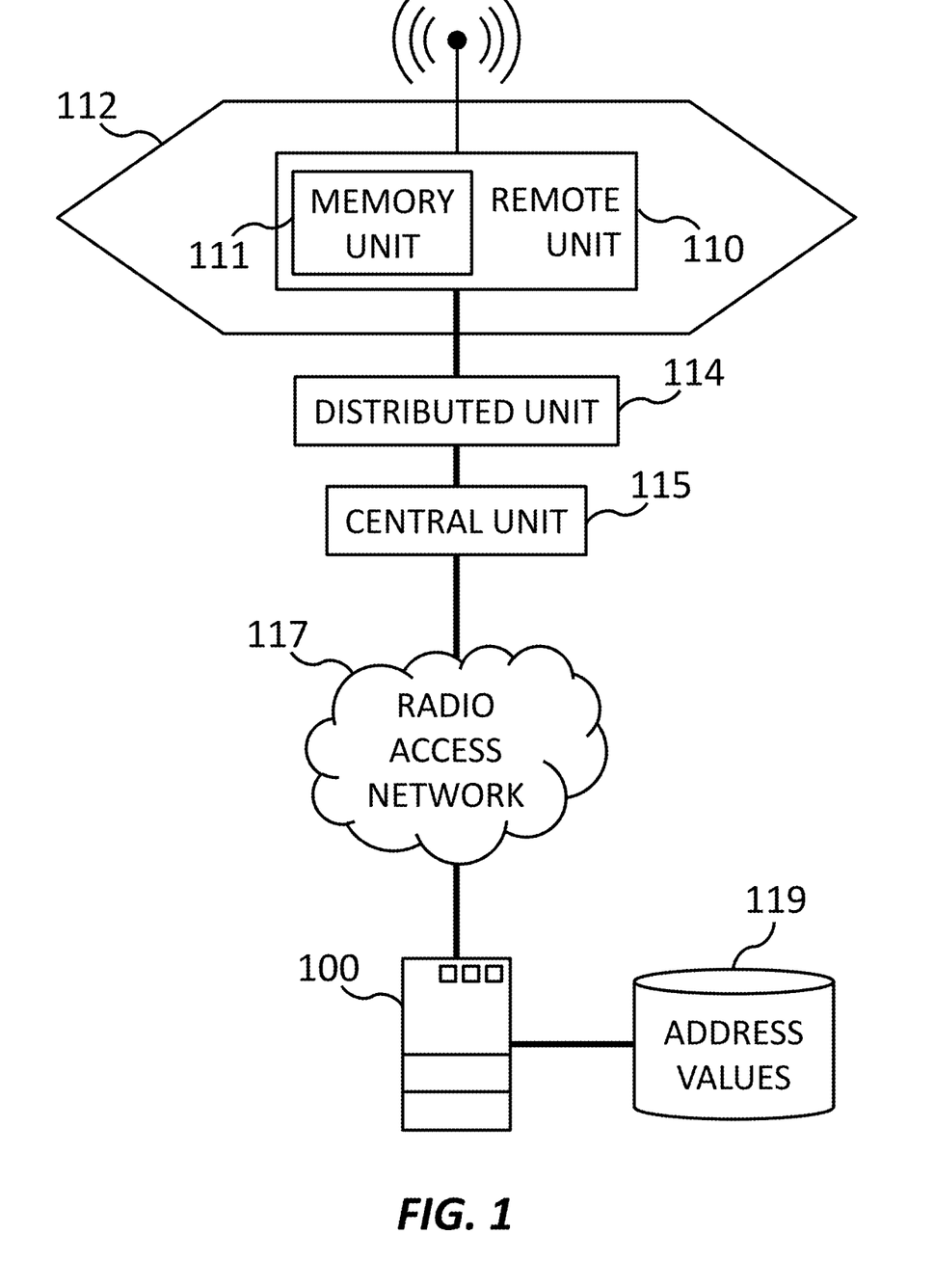
FIG. 1 is a schematic diagram of a system for radio access network address assignment, according to at least some embodiments of the present invention.

FIG. 1 is a schematic diagram of a system for radio access network address assignment, according to at least some embodiments of the present invention. The system includes an apparatus 100, an access point 112, a radio access network 117, and a pool of address values 119.

Radio access network 117 is a wireless communication network including access points, such as access point 112. In at least some embodiments, radio access network 117 is configured to operate under 4G standards, 5G standards, or any other wide area radio access network protocol. In at least some embodiments, radio access network 117 includes a backend portion including core elements, such as an automation block including an OSS, and performing Life Cycle Management (LCM), Configuration Management as a Service (CMaaS), etc., communicating through a wired network.

Access point 112 includes radio unit 110, distributed unit 114, and central unit 115. In at least some embodiments, access point 112 includes a plurality of distributed units, including distributed unit 114, and a plurality of radio units, including radio unit 110. In at least some embodiments, radio unit 110 is configured to communicate with radio access network 117 through distributed unit 114. In at least some embodiments, radio unit 110 includes a memory unit 111 to store an IP address of distributed unit 114 as a management address. In at least some embodiments, access point 112 is configured to operate under 4G standards, such as an eNB node, 5G standards, such as a gNB node, etc.

Apparatus 100 is configured to perform radio access network address assignment. In at least some embodiments, apparatus 100 is configured to operate as an OSS. In at least some embodiments, apparatus 100 is in communication with access point 112 through radio access network 117. In at least some embodiments, apparatus 100 is a personal computer, server, mainframe, etc., including instructions which are executed by a controller to perform radio access network address assignment. In at least some embodiments, apparatus 100 is in communication with radio unit 110, distributed unit 114, and central unit 115 through wired communication.

Figure 2:
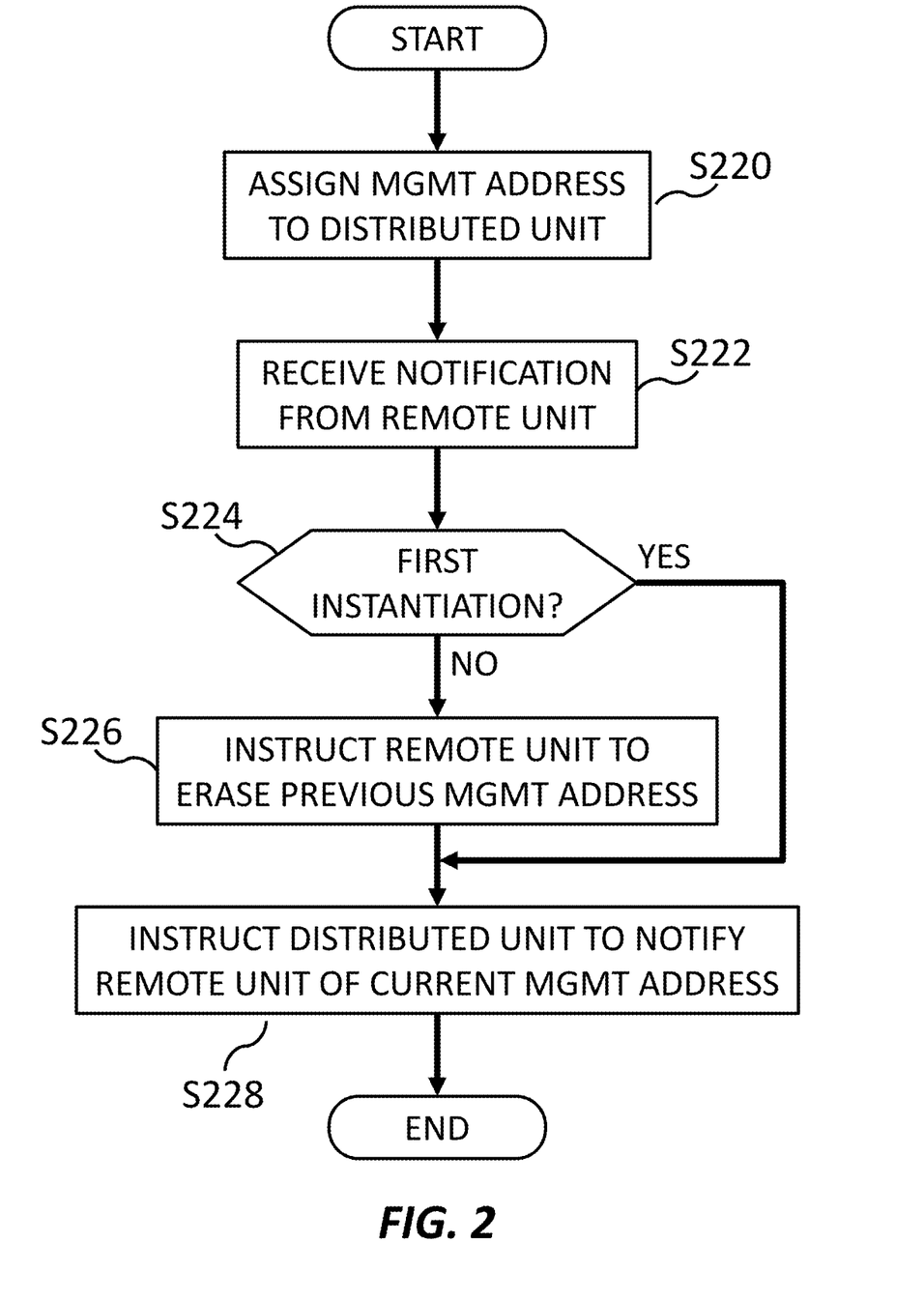
FIG. 2 is an operational flow for radio access network address assignment, according to at least some embodiments of the present invention.

FIG. 2 is an operational flow for radio access network address assignment, according to at least some embodiments of the present invention. The operational flow provides a method of radio access network address assignment. In at least some embodiments, the method is performed by a controller of an apparatus including sections for performing certain operations, such as the controller and apparatus shown in FIG. 5, which will be explained hereinafter.

Figure 3:
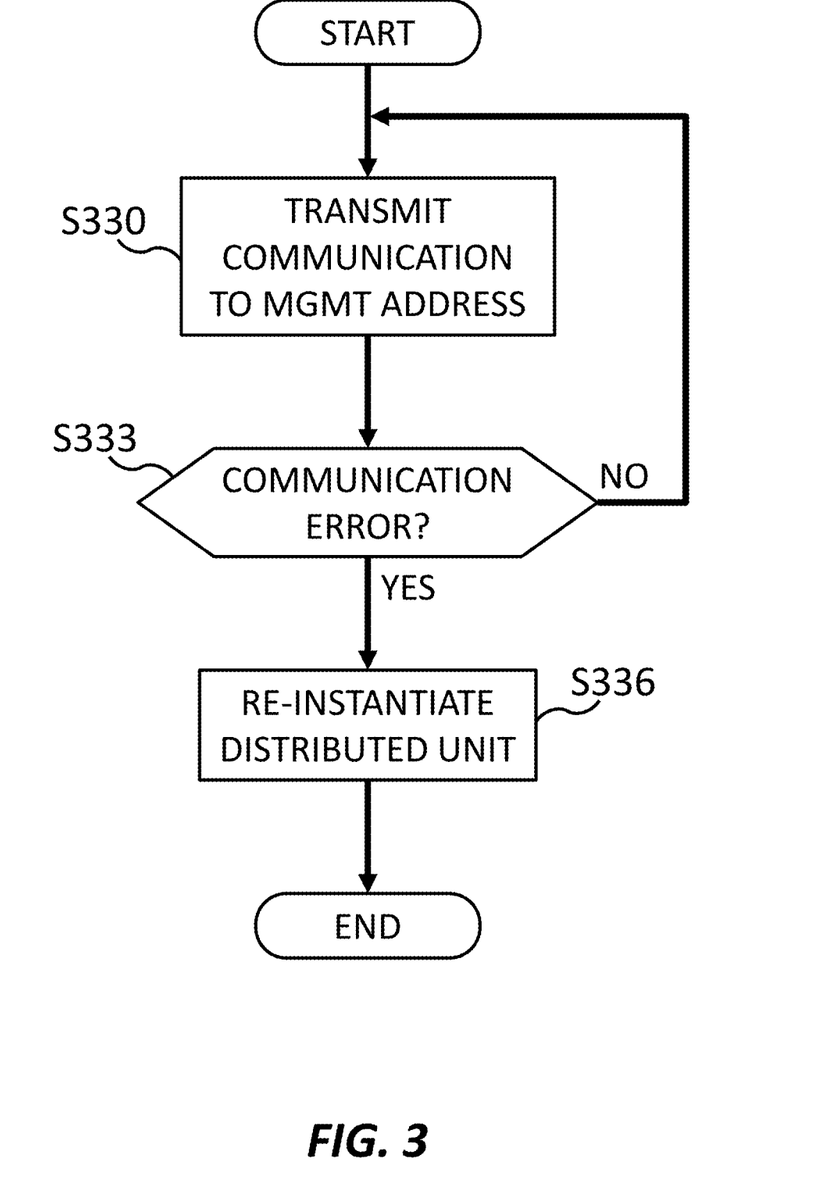
FIG. 3 is an operational flow for management address assignment, according to at least some embodiments of the present invention.

At S220, an assigning section assigns a management address to a distributed unit. In at least some embodiments, the assigning section assigns, to a distributed unit of an access point for a radio access network, a first management address value from a pool of address values. In at least some embodiments, the assigning section assigns the first management address value as part of a re-instantiation of the distributed unit. In at least some embodiments, the assigning section assigns the first management address as part of an instantiation process, which brings an access point up and online for the first time as part of the radio access network of the apparatus. In at least some embodiments, the assigning proceeds as shown in FIG. 3, which will be explained hereinafter.

At S222, a receiving section receives a notification from a radio unit. In at least some embodiments, the receiving section receives a notification from a radio unit connected to the radio access network through the distributed unit. In at least some embodiments, the receiving section receives a "power on" notification from the radio unit. In at least some embodiments, the notification indicates that the radio unit has powered on. In at least some embodiments, the receiving section or a sub-section thereof authenticates the notification from the radio unit, such as by comparing an authentication certificate accompanying the notification with a locally stored authentication certificate.

At S224, the controller or a sub-section thereof determines whether this is the first instantiation of the distributed unit. In at least some embodiments, the controller determines whether the distributed unit has previously been part of the radio access network, or whether the distributed unit is newly joining the radio access network. If the controller determines that this is not the first instantiation of the distributed unit, then the operational flow proceeds to radio unit instruction at S226. If the controller determines that this is the first instantiation of the distributed unit, then the operational flow proceeds to distributed unit instruction at S228 without radio unit instruction.

At S226, an instructing section instructs the radio unit to erase a previously recorded management address. In at least some embodiments, the instructing section instructs the radio unit to erase a recording of a second management address value in a memory unit of the radio unit. In at least some embodiments, the instructing section instructs the radio unit to delete all data in the memory unit. In at least some embodiments, the instructing section pushes a data deletion instruction to the radio unit so that the radio unit is treated as a new radio unit by the distributed unit. In at least some embodiments, the instructing section instructs the radio unit in response to receiving the notification from the radio unit. In at least some embodiments, the instructing the radio unit includes providing an authentication certificate to the radio unit.

Figure 4:
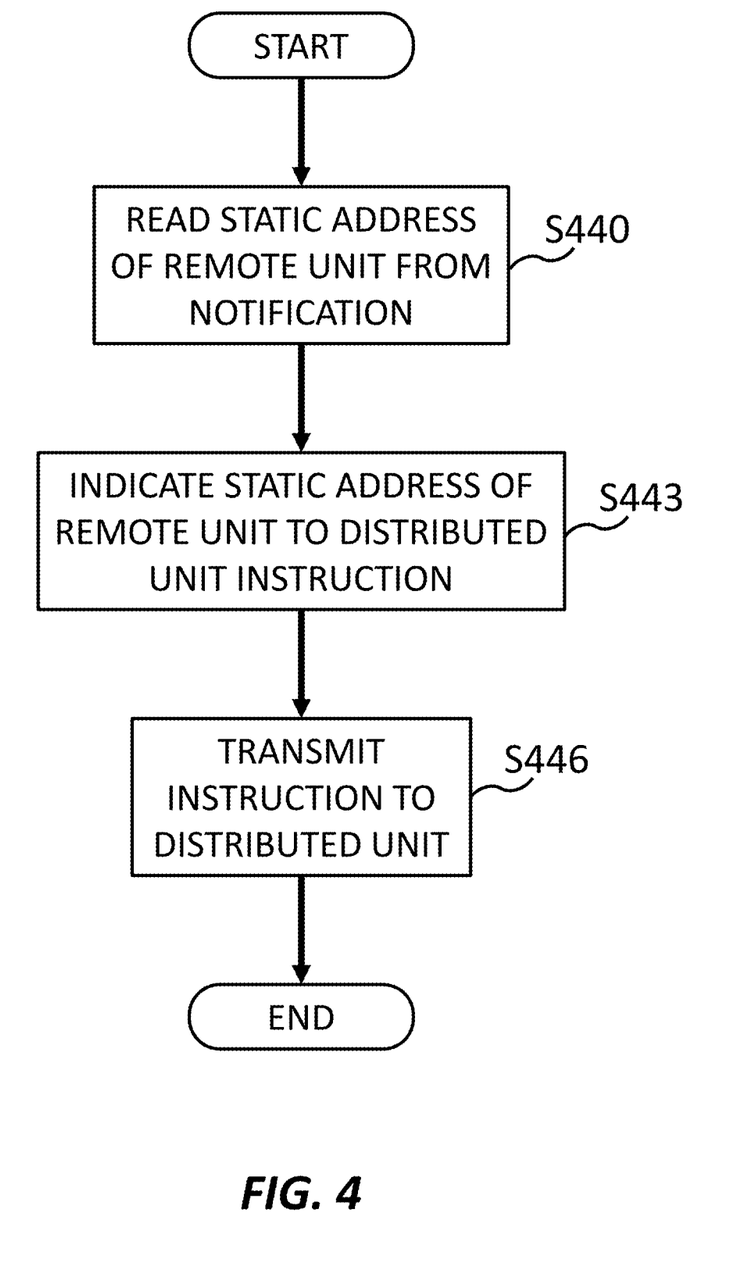
FIG. 4 is an operational flow for notification instruction, according to at least some embodiments of the present invention.

At S228, the instructing section instructs the distributed unit to notify the radio unit of the currently assigned management address of the distributed unit. In at least some embodiments, the instructing section instructs the distributed unit to notify the radio unit of the first management address value after instructing the radio unit. In at least some embodiments, the distributed unit instructing proceeds as shown in FIG. 4, which will be explained hereinafter.

FIG. 3 is an operational flow for management address assignment, according to at least some embodiments of the present invention. The operational flow provides a method of management address assignment. In at least some embodiments, the method is performed by an assigning section of an apparatus including sections for performing certain operations, such as the apparatus shown in FIG. 5, which will be explained hereinafter.

At S330, an assigning section or a sub-section thereof transmits a communication to a management address. In at least some embodiments, the assigning section transmits a test communication to a distributed unit or a radio unit at the management address. In at least some embodiments, the management address is an IP address used by the radio access network for communication with the distributed unit and each radio unit in communication with the radio access network through the distributed unit.

At S333, the assigning section or a sub-section thereof detects whether a communication error has occurred. In at least some embodiments, the assigning section causes a detecting section to detect whether a communication error has occurred. In at least some embodiments, the assigning section detects that a communication error has occurred in response to receiving an error message, in response to a predetermined amount of time elapsing without a response, etc. In at least some embodiments, the assigning section detects, before assigning the first management address value, that the second management address value is no longer assigned to the distributed unit. If the assigning section detects that a communication error has not occurred, then the operational flow returns to communication transmission at S330. If the assigning section detects that a communication error has occurred, then the operational flow proceeds to distributed unit re-instantiation at S336.

At S336, the assigning section or a sub-section thereof re-instantiates the distributed unit. In at least some embodiments, the assigning section assigns the first management address value as part of a re-instantiation of the distributed unit. In at least some embodiments, the assigning section performs a parameter push to the distributed unit, which causes the radio unit to transmit a "power on" notification to the apparatus.

In at least some embodiments, re-instantiation is triggered in response to other criteria, such as completion of updates.

FIG. 4 is an operational flow for notification instruction, according to at least some embodiments of the present invention. The operational flow provides a method of notification instruction. In at least some embodiments, the method is performed by an instructing section of an apparatus including sections for performing certain operations, such as the apparatus shown in FIG. 5, which will be explained hereinafter.

At S440, the instructing section or a sub-section thereof reads a static address of the radio unit from the notification. In at least some embodiments, the instructing section reads a static address of a radio unit from a "power on" notification received from the radio unit. In at least some embodiments, the static address is a Media Access Control (MAC) address.

At S443, the instructing section or a sub-section thereof indicates the static address of the radio unit in an instruction to a distributed unit. In at least some embodiments, the instructing section indicates more than one static address in the instruction in response to receiving a "power on" notification from more than one radio unit in communication with the radio access network through the distributed unit.

At S446, the instructing section transmits the instruction to the distributed unit. In at least some embodiments, the instructing section transmits the static address of the radio unit to the distributed unit as part of the instruction.

Figure 5:
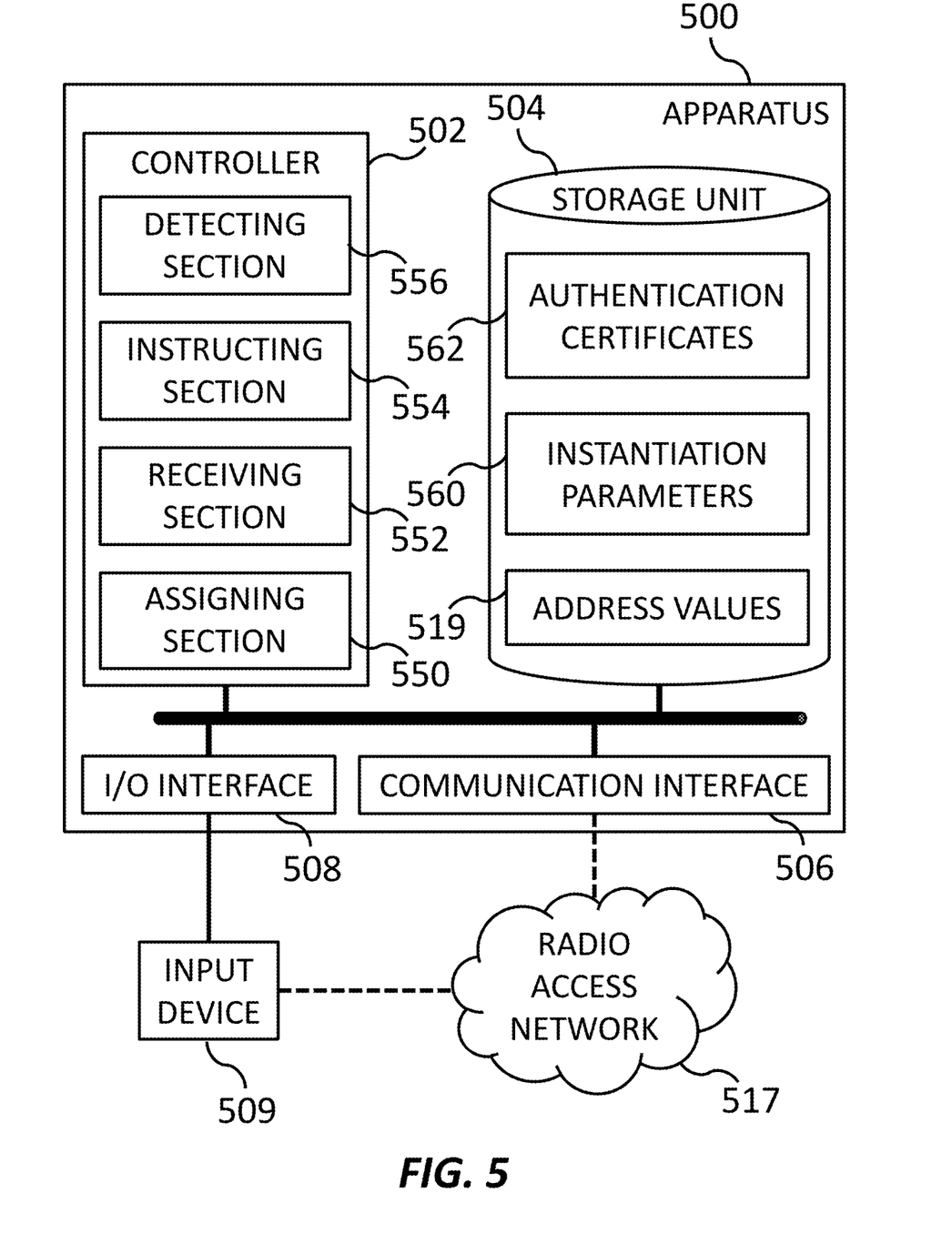
FIG. 5 is a block diagram of a hardware configuration for radio access network address assignment, according to at least some embodiments of the present invention.

FIG. 5 is a block diagram of a hardware configuration for radio access network address assignment, according to at least some embodiments of the present invention.

The exemplary hardware configuration includes apparatus 500, which interacts with input device 509, and communicates with radio access network 517. In at least some embodiments, apparatus 500 is integrated with input device 509. In at least some embodiments, apparatus 500 is a computer system that executes computer-readable instructions to perform operations for radio access network address assignment.

Apparatus 500 includes a controller 502, a storage unit 504, a communication interface 506, and an input/output interface 508. In at least some embodiments, controller 502 includes a processor or programmable circuitry executing instructions to cause the processor or programmable circuitry to perform operations according to the instructions. In at least some embodiments, controller 502 includes analog or digital programmable circuitry, or any combination thereof. In at least some embodiments, controller 502 includes physically separated storage or circuitry that interacts through communication. In at least some embodiments, storage unit 504 includes a non-volatile computer-readable medium capable of storing executable and non-executable data for access by controller 502 during execution of the instructions. Communication interface 506 transmits and receives data from radio access network 517. Input/output interface 508 connects to input device 508 via a parallel port, a serial port, a keyboard port, a mouse port, a monitor port, and the like to exchange information.

Controller 502 includes assigning section 550, receiving section 552, instructing section 554, and detecting section 556. Storage unit 504 includes address values 519, instantiation parameters 560, and authentication certificates 562.

Assigning section 550 is the circuitry or instructions of controller 502 configured to assig addresses. In at least some embodiments, assigning section 550 is configured to assign, to a distributed unit of an access point for a radio access network, a first management address value from a pool of address values. In at least some embodiments, assigning section 550 utilizes information in storage unit 504, such as address values 519 and instantiation parameters 560, and records information in storage unit 504, such as authentication certificates 562. In at least some embodiments, assigning section 550 includes sub-sections for performing additional functions, as described in the foregoing flow charts. In at least some embodiments, such sub-sections are referred to by a name associated with a corresponding function.

Receiving section 552 is the circuitry or instructions of controller 502 configured to receive notifications. In at least some embodiments, receiving section 552 is configured to receive a notification from a radio unit connected to the radio access network through the distributed unit. In at least some embodiments, receiving section 552 utilizes information in storage unit 504, such as instantiation parameters 560. In at least some embodiments, receiving section 552 includes sub-sections for performing additional functions, as described in the foregoing flow charts. In at least some embodiments, such sub-sections are referred to by a name associated with a corresponding function.

Instructing section 554 is the circuitry or instructions of controller 502 configured to issue instructions to radio units, distributed units, etc. In at least some embodiments, instructing section 554 is configured to instruct the radio unit to erase a recording of a second management address value in a memory unit of the radio unit. In at least some embodiments, instructing section 554 utilizes information from storage unit 504, such as instantiation parameters 560 and authentication certificates 562. In at least some embodiments, instructing section 554 includes sub-sections for performing additional functions, as described in the foregoing flow charts. In at least some embodiments, such sub-sections are referred to by a name associated with a corresponding function.

Detecting section 556 is the circuitry or instructions of controller 502 configured to detect communication errors. In at least some embodiments, detecting section 556 is configured to detect, before assigning the first management address value, that the second management address value is no longer assigned to the distributed unit. In at least some embodiments, detecting section 556 utilizes information in storage unit 504, such as instantiation parameters 560. In at least some embodiments, detecting section 556 includes sub-sections for performing additional functions, as described in the foregoing flow charts. In at least some embodiments, such sub-sections are referred to by a name associated with a corresponding function.

In at least some embodiments, the apparatus is another device capable of processing logical functions in order to perform the operations herein. In at least some embodiments, the controller and the storage unit need not be entirely separate devices, but share circuitry or one or more computer-readable mediums in some embodiments. In at least some embodiments, the storage unit includes a hard drive storing both the computer-executable instructions and the data accessed by the controller, and the controller includes a combination of a central processing unit (CPU) and RAM, in which the computer-executable instructions are able to be copied in whole or in part for execution by the CPU during performance of the operations herein.

In at least some embodiments where the apparatus is a computer, a program that is installed in the computer is capable of causing the computer to function as or perform operations associated with apparatuses of the embodiments described herein. In at least some embodiments, such a program is executable by a processor to cause the computer to perform certain operations associated with some or all of the blocks of flowcharts and block diagrams described herein.

At least some embodiments are described with reference to flowcharts and block diagrams whose blocks represent (1) steps of processes in which operations are performed or (2)

sections of a controller responsible for performing operations. In at least some embodiments, certain steps and sections are implemented by dedicated circuitry, programmable circuitry supplied with computer-readable instructions stored on computer-readable media, and/or processors supplied with computer-readable instructions stored on computer-readable media. In at least some embodiments, dedicated circuitry includes digital and/or analog hardware circuits and include integrated circuits (IC) and/or discrete circuits. In at least some embodiments, programmable circuitry includes reconfigurable hardware circuits comprising logical AND, OR, XOR, NAND, NOR, and other logical operations, flip-flops, registers, memory elements, etc., such as field-programmable gate arrays (FPGA), programmable logic arrays (PLA), etc.

In at least some embodiments, the computer readable storage medium includes a tangible device that is able to retain and store instructions for use by an instruction execution device. In some embodiments, the computer readable storage medium includes, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

In at least some embodiments, computer readable program instructions described herein are downloadable to respective computing/processing devices from a computer readable storage medium or to an external computer or external storage device via a network, for example, the Internet, a local area network, a wide area network and/or a wireless network. In at least some embodiments, the network includes copper transmission cables, optical transmission fibers, wireless transmission, routers, firewalls, switches, gateway computers and/or edge servers. In at least some embodiments, a network adapter card or network interface in each computing/processing device receives computer readable program instructions from the network and forwards the computer readable program instructions for storage in a computer readable storage medium within the respective computing/processing device.

In at least some embodiments, computer readable program instructions for carrying out operations described above are assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. In at least some embodiments, the computer readable program instructions are executed entirely on the users computer, partly on the users computer, as a stand-alone software package, partly on the users computer and partly on a remote computer or entirely on the remote computer or server. In at least some embodiments, in the latter scenario, the remote computer is connected to the users computer through any type of network, including a local area network (LAN) or a wide area network (WAN), or the connection is made to an external computer (for example, through the Internet using an Internet Service Provider). In at least some embodiments, electronic circuitry including, for example, programmable logic circuitry, field-programmable gate arrays (FPGA), or programmable logic arrays (PLA) execute the computer readable program instructions by utilizing state information of the computer readable program instructions to individualize the electronic circuitry, in order to perform aspects of the present invention.

While embodiments of the present invention have been described, the technical scope of any subject matter claimed is not limited to the above described embodiments. Persons skilled in the art would understand that various alterations and improvements to the above-described embodiments are possible. Persons skilled in the art would also understand from the scope of the claims that the embodiments added with such alterations or improvements are included in the technical scope of the invention.

The operations, procedures, steps, and stages of each process performed by an apparatus, system, program, and method shown in the claims, embodiments, or diagrams are able to be performed in any order as long as the order is not indicated by "prior to," "before," or the like and as long as the output from a previous process is not used in a later process. Even if the process flow is described using phrases such as "first" or "next" in the claims, embodiments, or diagrams, such a description does not necessarily mean that the processes must be performed in the described order.

According to at least some embodiments of the present invention, radio access network address assignment is performed by assigning, to a distributed unit of an access point for a radio access network, a first management address value from a pool of address values, receiving a notification from a radio unit connected to the radio access network through the distributed unit, instructing the radio unit to erase a recording of a second management address value in a memory unit of the radio unit, and instructing the distributed unit to notify the radio unit of the first management address value after instructing the radio unit.

Some embodiments include the instructions in a computer program, the method performed by the processor executing the instructions of the computer program, and an apparatus that performs the method. In some embodiments, the apparatus includes a controller including circuitry configured to perform the operations in the instructions.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A computer-readable storage medium including instructions executable by a computer to cause the computer to perform operations comprising:
   assigning, to a distributed unit (DU) of an access point for a radio access network by an apparatus in communication with the DU through the radio access network, a new management address value from a pool of address values;
   receiving a notification from a radio unit (RU) connected to the radio access network through the DU;
   instructing the RU to erase a recording of an existing management address value in a memory unit included in the RU, wherein the existing management address value was previously assigned to the DU; and
   instructing the DU to notify the RU of the new management address value after instructing the RU;
   wherein the new management address value and the existing management address value each serve as a management address from the perspective of the RU connected to the DU.

2. The computer-readable medium of claim 1, wherein the operations further comprise:
   detecting, before assigning the new management address value, that the existing management address value is no longer assigned to the distributed unit.

3. The computer-readable medium of claim 1, wherein the assigning the new management address value is part of a re-instantiation of the distributed unit.

4. The computer-readable medium of claim 1, wherein the notification indicates that the radio unit has powered on.

5. The computer-readable medium of claim 1, wherein the instructing the radio unit is in response to receiving the notification from the radio unit.

6. The computer-readable medium of claim 1, wherein the operations further comprise:
   authenticating the notification from the radio unit.

7. The computer-readable medium of claim 1, wherein the instructing the radio unit includes providing an authentication certificate.

8. The computer-readable medium of claim 1, wherein the instructing the distributed unit includes:
   reading a static address of the radio unit from the notification; and
   transmitting the static address of the radio unit to the distributed unit.

9. A method comprising:
   assigning, to a distributed unit (DU) of an access point for a radio access network by an apparatus in communication with the DU through the radio access network, a new management address value from a pool of address values;
   receiving a notification from a radio unit (RU) connected to the radio access network through the DU;
   instructing the RU to erase a recording of an existing management address value in a memory unit included in the RU, wherein the existing management address value was previously assigned to the DU; and
   instructing the DU to notify the RU of the new management address value after instructing the RU;
   wherein the new management address value and the existing management address value each serve as a management address from the perspective of the RU connected to the DU.

10. The method of claim 9, further comprising:
    detecting, before assigning the new management address value, that the existing management address value is no longer assigned to the distributed unit.

11. The method of claim 9, wherein the assigning the new management address value is part of a re-instantiation of the distributed unit.

12. The method of claim 9, wherein the notification indicates that the radio unit has powered on.

13. The method of claim 9, wherein the instructing the radio unit is in response to receiving the notification from the radio unit.

14. The method of claim 9, further comprising:
    authenticating the notification from the radio unit.

15. The method of claim 9, wherein the instructing the radio unit includes providing an authentication certificate.

16. The method of claim 9, wherein the instructing the distributed unit includes:
    reading a static address of the radio unit from the notification; and
    transmitting the static address of the radio unit to the distributed unit.

17. An apparatus comprising:
    a controller including circuitry configured to:
        assign, to a distributed unit (DU) of an access point for a radio access network by an apparatus in communication with the DU through the radio access network, a new management address value from a pool of address values;
        receive a notification from a radio unit (RU) connected to the radio access network through the DU;
        instruct the RU to erase a recording of an existing management address value in a memory unit included in the RU, wherein the existing management address value was previously assigned to the DU; and
        instruct the DU to notify the RU of the new management address value after instructing the RU;
        wherein the new management address value and the existing management address value each serve as a management address from the perspective of the RU connected to the DU.

18. The apparatus of claim 17, wherein the circuitry is further configured to:
    detect, before assigning the new management address value, that the existing management address value is no longer assigned to the distributed unit.

19. The apparatus of claim 17, wherein the assigning the new management address value is part of a re-instantiation of the distributed unit.

20. The apparatus of claim 17, wherein the notification indicates that the radio unit has powered on.

* * * * *